(12) United States Patent
Johnson

(10) Patent No.: US 9,810,272 B1
(45) Date of Patent: Nov. 7, 2017

(54) ONE-WAY CLUTCH

(71) Applicant: Alan Kent Johnson, Oak Forest, IL (US)

(72) Inventor: Alan Kent Johnson, Oak Forest, IL (US)

( * ) Notice: Subject to any disclaimer, the term of this patent is extended or adjusted under 35 U.S.C. 154(b) by 0 days.

(21) Appl. No.: 15/626,323

(22) Filed: Jun. 19, 2017

(51) Int. Cl.
*F16D 41/07* (2006.01)
*F16D 41/063* (2006.01)

(52) U.S. Cl.
CPC ........... *F16D 41/07* (2013.01); *F16D 41/063* (2013.01)

(58) Field of Classification Search
CPC ........ F16D 41/06; F16D 41/063; F16D 41/07; F16D 41/24; F16D 41/28; F16D 2041/0601; F16D 2041/0603
See application file for complete search history.

(56) References Cited

U.S. PATENT DOCUMENTS

| | | |
|---|---|---|
| 67,659 A | 8/1867 | Langen |
| 684,478 A | 10/1901 | Trimble |
| 2,150,715 A | 3/1939 | De Falco |
| 3,202,250 A | 8/1965 | Fulton |
| 3,595,354 A | 7/1971 | Charpentier |
| 5,328,415 A | 7/1994 | Furutani |
| 7,160,351 B2 | 1/2007 | Trasorras |
| 7,854,305 B2 | 12/2010 | Smetana |
| 7,987,958 B2 | 8/2011 | Hemphill |
| 8,020,681 B2 | 9/2011 | Davis |
| 9,016,451 B2 | 4/2015 | Davis |
| 9,353,802 B2 | 5/2016 | Lee |
| 9,464,675 B1 | 10/2016 | He |
| 2016/0084326 A1 | 3/2016 | Ramsey |
| 2016/0341262 A1 | 11/2016 | Ramsey |

OTHER PUBLICATIONS

Jian Yao, Li Chen, and Chengliang Yin, "Modeling and Stability of Wedge Clutch System," Mathematical Problems in Engineering, vol. 2014, May 5, 2014, 12 pages, Article ID 712472; Hindawi Publishing Corp.; Shanghai China, http://dx.doi.org/10.1155/2014/712472.

*Primary Examiner* — Jacob S Scott

(57) ABSTRACT

A one-way clutch, including: a load rotor, a driving member, and at least one self-locking gripper. The load rotor is spool-shaped and includes two circular contact races, one race at each end of the rotor. The driving member includes a plurality of inward facing cams on an inner circumference arranged to rotate co-axially with the load rotor. The cams rotate within the space separating the two load rotor races. When in a locking position each gripper presses against both load rotor races and a cam over area-to-area contacting surfaces. Rotation of the load rotor and driving member are locked in the first direction when one or more grippers are in the locking position. The driving member is rotatable independent of the load rotor in the second, free-wheeling direction. During free-wheeling rotation centrifugal force acts to disengage the grippers from the load rotor, thus reducing or eliminating friction.

11 Claims, 18 Drawing Sheets

ONE-WAY CLUTCH

TECHNICAL FIELD

The present invention relates generally to a one-way clutch, and more specifically to a one-way clutch capable of sustaining a high number of high torque lock-and-unlock cycles while operating with reduced freewheeling friction.

BACKGROUND

Roller-ramp and sprag clutches are one-way clutches that operate automatically and are capable of supporting high torque loads. However, metal fatigue limits the cycle life of roller-ramp and sprag clutches in high torque uses. The ramp angle in roller-ramp clutches and the strut angle in sprags must be shallow to achieve locking action. These shallow angles produce very high compressive force on the sprags or rollers, also called "grippers." Because the force on these grippers is focused along narrow line contacts, high torque loading causes extreme pressure at the contacts. As a result, even the hardest steel alloys suffer metal fatigue after some number of high torque lock and release cycles. Cycle lifetimes of current technologies range from a few hundred thousand to a few million high torque cycles.

An advantage of roller-ramp and sprag clutch technologies is that the gripper elements are "self-locking." That is, once friction contact is established the grippers lock automatically without need of any external forces or mechanisms. Biasing springs are commonly present in these clutches but only function to initiate friction contact between the grippers and the surfaces of the clutch races. When used in an application in which inertial forces reliably initiate friction contact no springs are required for the function of self-locking grippers. The Langen Overrunning Clutch (U.S. Pat. No. 67,659 August 1867), shown in FIG. 29, is an example of a roller-ramp clutch using no biasing springs.

Numerous attempts have been made to replace the rollers and sprags of conventional one-way clutches with wedge shaped gripper elements so as to increase the contact area and thereby decrease pressure and stress, thus minimizing metal fatigue. For example U.S. Pat. No. 8,020,681 includes an embodiment with large contact surfaces on wedge shaped grippers. But wedge grippers are not generally self-locking and require springs to press the wedges against the ramp surfaces to hold the torque load. The necessary spring force for maintaining high torque grip produces exceedingly high freewheeling friction. In addition, if the torque load momentarily exceeds the spring force the wedges lose grip, producing a dangerous runaway clutch failure. Runaway clutch failures do not occur in a one-way clutch with self-locking grippers.

U.S. Pat. No. 3,202,250 by Bertram Fulton discloses a wedge clutch with self-locking grippers. The patent reveals that application of a low-friction coating at the ramp surface can make a wedge-shaped gripper self-locking if the ramp angle is sufficiently small. FIG. 28 shows an embodiment of Fulton's disclosure in which the ramp surfaces are placed on the outer race for the expressed purpose of reducing freewheeling friction. With radially inward facing ramps centrifugal force urges the wedges away from the inner race during freewheeling rotation, reducing friction or even lifting the wedge off the counter-rotating race. The following friction analysis of Fulton's model is necessary for disclosure of the present invention's innovations.

FIG. 22 is a diagram of the forces acting on wedge 41 in a clutch of the same configuration as the model in FIG. 28. Fo is the sum of the pressure on the wedge from contacting ramp surface 45 of outer race 43. Fi is the sum of the pressure on the wedge from contacting circular inner race 42. During the locked state Fi and Fo must be equal in magnitude, opposite in direction and co-linear, and therefore angle $\theta o$ is equal to $\theta i$. To produce self-locking action the wedge must slip at the ramp surface when the wedge slips against the inner race. For the wedge to slip at the ramp surface the ratio Fto/Fno must be greater than the coefficient of friction $\mu o$ at the ramp, where Fto is the frictional component and Fno is the normal component of force Fo. Therefore angle $\phi o$ must be greater than the friction angle $\arctan(\mu o)$ for locking action to occur. During slip at the inner race the ratio Fti/Fni is the kinetic coefficient of friction $\mu i$, where Fti is the frictional component and Fni is the normal component of Fi. Therefore the sum of angles $(\theta i + \phi i)$ is equal to friction angle $\arctan(\mu i)$. It can be shown that combining these conditions leads to the following requirement for self-locking action:

$$\arctan(\mu o) < \arctan(\mu i) - \alpha - \phi i \qquad (1)$$

where $\alpha$ is the slope angle of the ramp. The larger the magnitude of $\phi i$ the more difficult it is to comply with condition (1). But $\phi i$ increases as the ratio Ro/Ri increases, where Ro is the rotational radius of Fo and Ri is the rotational radius of Fi. That is, the magnitude of $\phi i$ increases with the thickness of the wedge. In practice $\phi i$ often reaches a value that makes satisfying requirement (1) unattainable, or attainable for only small values of $\alpha$. Therefore wedge-clutch designs with outer race ramps use thin spiral wedges and very shallow ramp angles. However a shallow ramp angle is known to lead to "lock up," a state in which a wedge permanently jams between the races. Substantial force may be necessary to free up a locked up wedge. Additionally, wedge-clutch designs typically specify a circular ramp curvature or leave the ramp curvature unspecified. But a circular or undefined ramp curve does not distribute pressure evenly along the contacting surfaces, especially in spiral-type ramps. Instead these curvatures focus most of the compressive force on a small section of the wedge, leading to lock ups and fatigue processes.

Placement of the ramps on the inside race in a wedge-clutch design reverses the effect of the $\phi i$ term in equation (1) and makes self-locking action more easily attainable. Most all wedge-clutch designs therefore use inner race ramps. But inner race ramps put the wedges in constant friction contact with the outer race during freewheeling rotation. This effect generates undesirable wear and friction, especially during long periods of high speed counter-rotation. High speed freewheeling is also known to cause freewheeling lockup in operation of inner ramp wedge-clutch designs. U.S. Pat. No. 9,016,451 discloses an inner ramp wedge-clutch with reduced freewheeling friction by use of a spring mechanism built into a wedge ring. Though reduced the design still requires significant freewheeling friction to initiate locking action and is still subject to freewheeling lockup. Other designs, for example U.S. Pat. No. 9,353,802, use an external actuator to disengage the wedges from the outer race during freewheeling operation. These designs do not operate automatically, however, and require additional and complex external mechanisms for operation of the clutch.

BRIEF SUMMARY OF THE INVENTION

The present invention broadly comprises a one-way clutch including a driving member, a load rotor, and at least one gripper element. The load rotor includes two radially outward facing circular contact races and an inner shaft. The load rotor inner shaft and contact races are arranged for rotation about the axis of rotation of the clutch, with the two contact races separated at a fixed longitudinal distance and rigidly connected to the inner shaft. The rotational radius of the load rotor inner shaft is smaller than the radius of the contact races, forming a spool-shaped rotor. The load rotor is arranged for rotational connection to a torque load in most embodiments, or to a power source in others.

The clutch driving member includes an inner circumference with a plurality of radially inward facing cam surfaces on the inner circumference. The driving member is arranged co-axially to the load rotor with the cam surfaces rotatable around the load rotor inner shaft and within the longitudinal distance separating the two load rotor races. A space is provided between the driving member inner circumference and the load rotor inner shaft and races. The driving member is arranged for rotational connection to a source of torque in most embodiments, or to a rotating load in others.

The clutch gripper elements are disposed in the space provided between the load rotor and the driving member. Each gripper includes three contact surfaces: two gripping surfaces and one slipping surface, with the slipping surface disposed between the two gripping surfaces. The gripper element contact surfaces are arranged to provide a locking position in which one gripping surface presses against one load rotor race, the second gripping surface presses against the other load rotor race, and the slipping surface presses against a driving member cam surface. The driving member includes a stop for each gripper element. Movement of the grippers relative the driving member in the first rotational direction is limited by the stops. In some embodiments the stops are made of an impact absorbing material; in other embodiments the stop includes an elastic element, such as a spring.

When in a locked mode of operation at least one gripper element is disposed in its locking position. In locked mode torque is transferred from the driving member to the load rotor through the gripper element(s) and rotation of the driving member and load rotor are locked in the first rotational direction. In a freewheeling mode of operation the driving member is free to rotate independently relative the load rotor in the second rotational direction, opposite the first direction of rotation. During freewheeling rotations of the driving member centrifugal forces urge the grippers to move radially outward, acting to disengage the grippers from the load rotor races.

Some embodiments of the present invention include aligning surfaces on the driving member and gripper elements arranged to limit motion of the grippers in the longitudinal, pitching and yawing directions during clutch operation. In some embodiments the curvature of the driving member cams follows a logarithmic spiral.

In the present invention the rotational radius of the forces at the clutch driving member cams, Ro, is adaptable in relation to the rotational radius of forces at the load rotor races, Ri. Specifically the ratio Ri/Ro can be made to approach or exceed unity. Friction physics discloses that increasing the ratio Ri/Ro also increases the cam surface ramp angle at which self-locking action of the clutch grippers can be achieved. Increasing the cam surface ramp angle decreases pressure and stress at the clutch contact surfaces, thereby increasing fatigue life and preventing clutch lock-ups. Some embodiments of the present invention include a means for decreasing friction at the interface between the gripper slipping surfaces and driving member cams, thereby further increasing the attainable cam surface ramp angle. Low-friction materials such as polyfluorotetraethylene are used in some embodiments and lubricating grease or oil is used in others. In some embodiments of the present invention the load rotor races are beveled at an angle to the axis of rotation so as to form a conical surface, a method which further acts to increase the attainable cam surface ramp angle.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Figure 11:
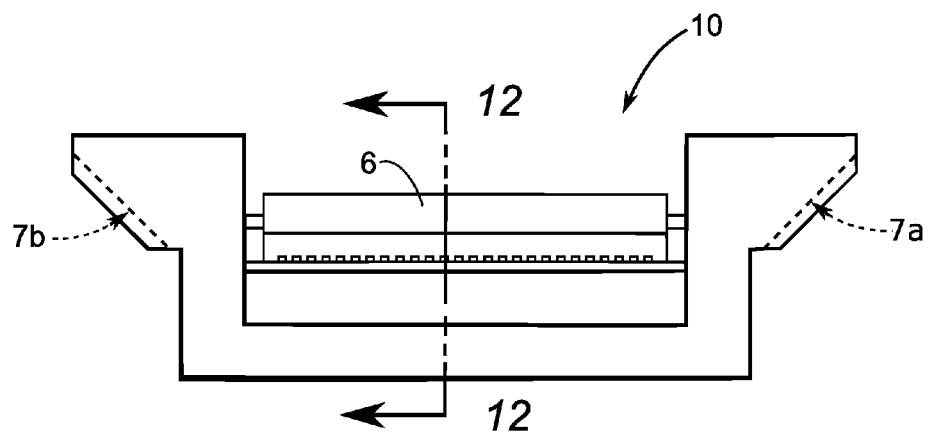
FIG. 11 is a longitudinal view gripper element 10 of clutch 100.

At the outset, it should be understood that the drawings of the disclosure are schematic in nature and may not be to scale. Features such as proportions, sizes, lengths, spacing, widths, and gaps may be exaggerated or otherwise altered for the sake of clarity. For example the size of gap g in FIG. 18 will likely be much smaller in practice than depicted, and the length of gripper 10 as depicted in FIG. 11 and other figures may be longer or shorter relative to other features in testing and practice. Additionally, the number of grippers, stops, and cam surfaces of the disclosure is not limited to the number depicted in these drawings.

Figure 1:
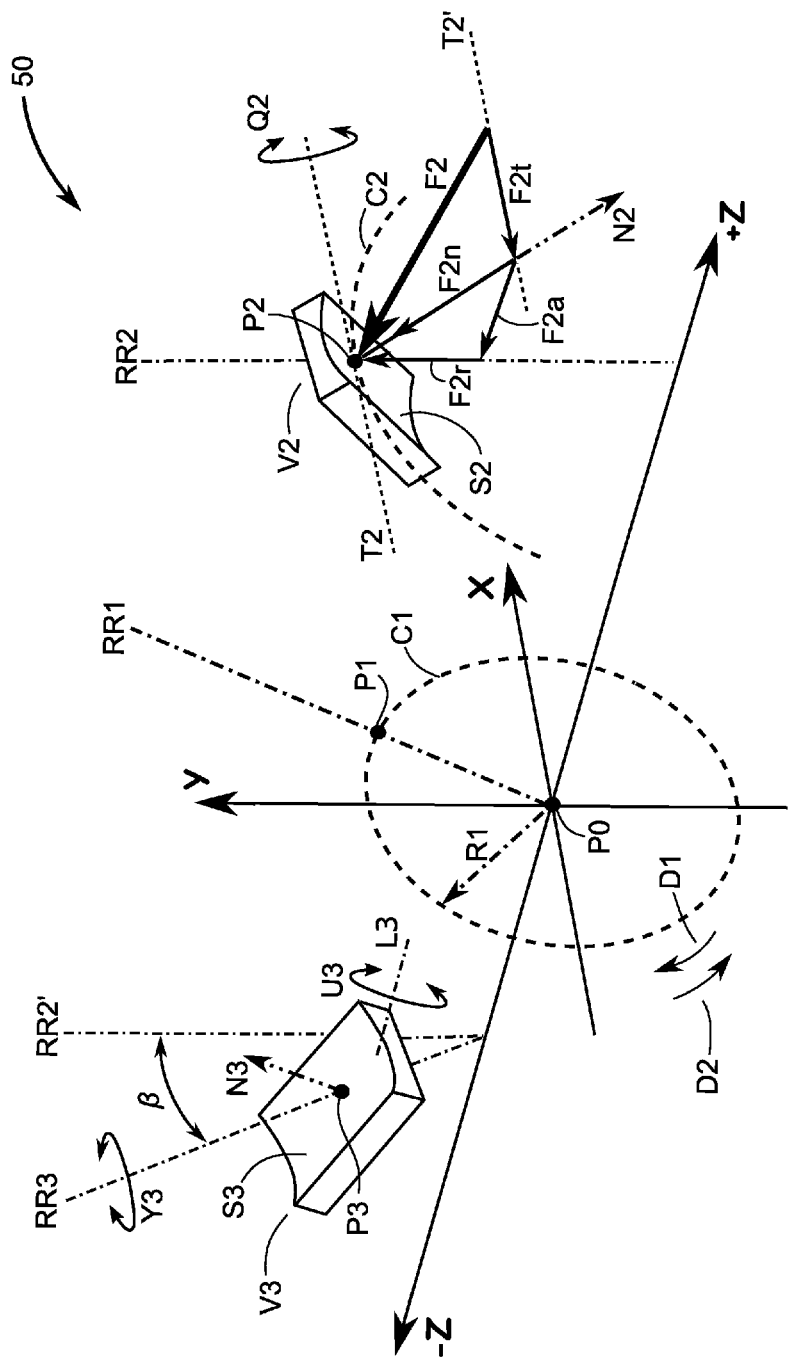
FIG. 1 is a perspective view of coordinate system 50, demonstrating the spatial terminology used in the disclosure.

FIG. 1 is a perspective view of coordinate system 50 used for demonstrating the spatial terminology used in the present invention. System 50 has orthogonal axes X, Y and Z and also includes elements of a cylindrical coordinate system. Axis Z is the invention's axis of rotation and the term "longitudinal" refers to the direction of the Z axis. A plane containing the Z axis will be termed an "axial plane." The origin Po is located approximately equidistant between the invention's load rotor races (described later). Any plane that is parallel to the X-Y plane is designated a "radial plane." A radial is a line extending from the Z axis and lying on a radial plane. The term radial motion and radial distance will refer to motion and distance respectively along a radial. P1 is a point on the X-Y plane and RR1 is the radial of P1. Circle C1 is the path of P1 as it rotates about axis Z and is termed the "rotational circle" of P1. R1 is the radius of C1 and is called the "rotational radius" of P1. D1 is the first direction of rotation and D2 is the second direction of rotation.

To demonstrate the terminology used for describing the orientation of various forces, lines and surfaces FIG. 1 includes objects V2 and V3. Point P2 lies on surface S2 of V2. Line N2 is the normal to surface S2 at point P2. Because the normals of S2 point away from the X-Y plane S2 is termed "longitudinally outward" facing. C2 is the rotational circle of P2 and N2. Because the normals of S2 are directed inside their rotational circles S2 is termed "radially inward" facing. Referring to object V3, N3 is the surface normal at point P3 of surface S3. Surface S3 is "longitudinally inward" facing and is "radially outward" facing. The terms "front" and "rear" will refer to the positive and negative directions of axis Z. For example, object V2 is in front of object V3. F2 is a force impinging on surface S2 at point P2. Force F2$n$ is the normal component of F2. That is, F2$n$ is the component of F2 that is perpendicular to the surface at P2. Line T2 is the tangent of C2 at P2. Line T2' is tangent T2 translated to the tail of F2 for diagrammatic purposes. Force F2$t$ is the component of force F2 parallel to T2 and will be called the rotational component of F2. Line RR2 is the radial at point P2. Force F2$r$ is the radial component of F2 and lies on RR2. Force F2$a$ is the component of F2 that is parallel to axis Z and will be called the longitudinal component of F2. Force F2 is the sum of F2$t$, F2$a$ and F2$r$. If F2$n$ lies on an axial plane then F2 is also the sum of F2$t$ and F2$n$. Referring to object V3, RR2' is the radial of P2 translated along the Z axis to the radial plane of P3. The angle between radials RR3 and RR2' will be called the rotational angle between point P3 and P2 and is marked β in FIG. 1. Rotation of an object about a radial passing through the object will be termed a rotation in the "yaw" direction. Rotation Y3 of object V3 is a yawing rotation. Rotation of an object about the tangent to a rotational circle passing through the object will be termed rotation in the "pitch" direction. Rotation Q2 of object V2 is a pitching rotation. Rotation of an object about an axis parallel to the Z axis, but not the Z axis, will be termed a rotation in the "roll" direction. In FIG. 1 line L3 is a line parallel to axis Z that passes through V3. Rotation U3 of V3 is a rolling rotation. An object that remains motionless in a frame of reference that is rotating about axis Z has no pitching, yawing or rolling motion in that frame of reference.

Figure 2:
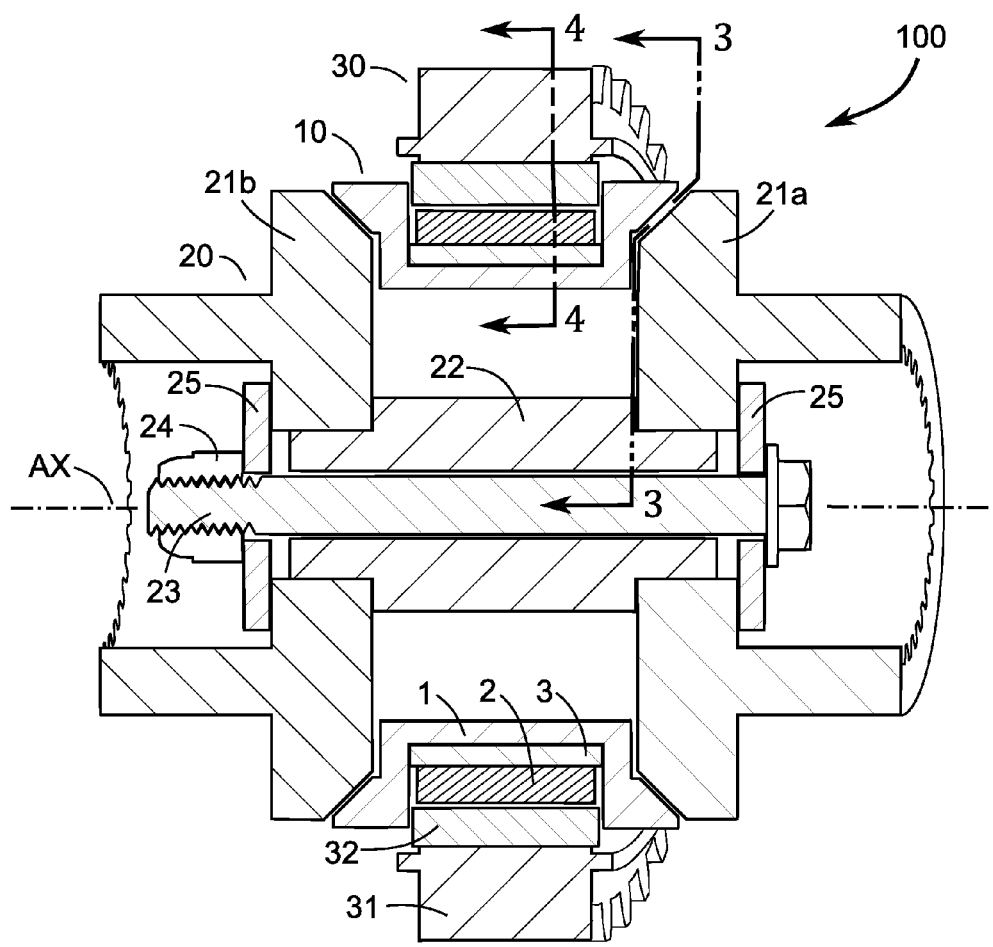
FIG. 2 is a sectional view of an exemplary embodiment of the invention, clutch 100, with the section taken along the rotational axis of the invention.

FIG. 2 is a longitudinal sectional view of an exemplary embodiment of the present invention, one-way clutch 100, with the section taken along the axis of rotation AX. Following standard practice, like drawing numbers on different drawing views of clutch 100 and the drawing views of other embodiments of the invention will identify identical, or functionally similar, structural elements. Load rotor 20 of clutch 100 includes front disc 21$a$, rear disc 21$b$ and inner shaft 22. Driving member 30 includes main gear 31 and cam blocks 32. Grippers 10 include cradles 1, pad holders 3 and pads 2. The load rotor is arranged for rotation about axis AX and is arranged for rotational connection to a torque load (not shown). The driving member is arranged to be rotatable co-axially to the load rotor and is arranged in a manner that limits longitudinal displacement in relation to the load rotor. The driving member is arranged for rotational connection to a source of power, that is, a source of rotating torque (not shown).

Figure 3:
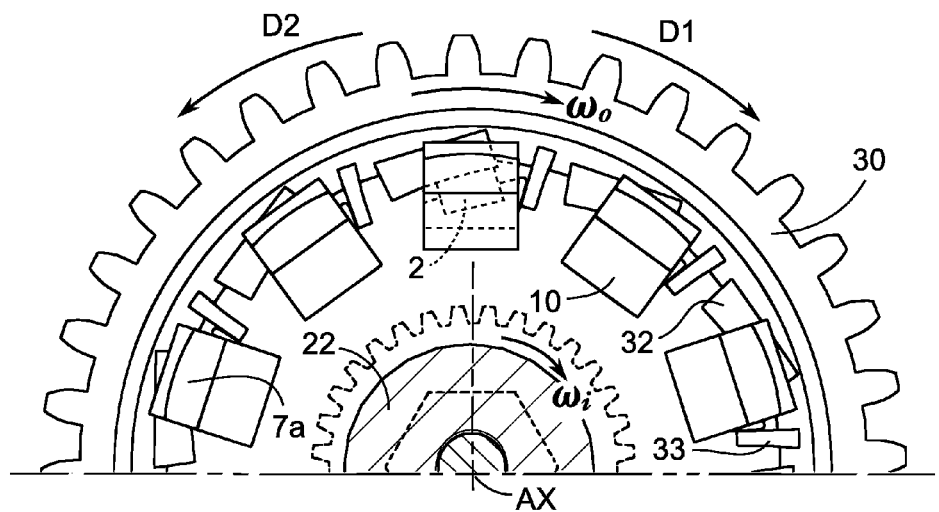
FIG. 3 is a sectional view of clutch 100 taken along the line 3-3 of FIG. 2.

FIG. 3 is a sectional view of clutch 100 taken along line 3-3 of FIG. 2. Grippers 10 are movable in the radial and rotational directions relative driving member 30. The grippers are shown in their recessed position and the position of pad 2 is shown in hidden lines. When in the recessed position the grippers rest against both cam blocks 32 and stops 33. Stops 33 limit the rotation of the grippers in the D1 direction relative the driving member.

Figure 4:
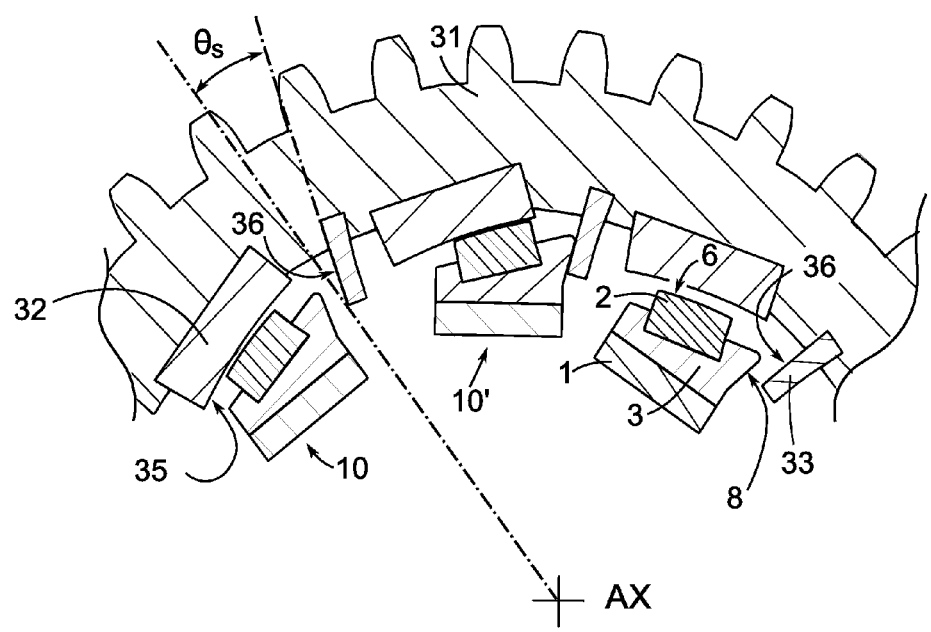
FIG. 4 is a partial sectional view of clutch 100 taken generally along the line 4-4 of FIG. 2.

FIG. 4 is a partial sectional view of clutch 100 taken along line 4-4 of FIG. 2. Three grippers 10 are shown and the gripper marked 10' is shown in its recessed position. Surfaces 36 of stops 33 contact surfaces 8 of grippers 10 when the grippers are in recessed position. Surfaces 36 are raked at angle θs to the radial as shown. During operation of the clutch reversal of rotation of the driving member from direction D1 to D2 may cause the stops to collide with the grippers. Rake angle θs of stop surfaces 36 direct the impact rebound of the grippers radially outward. Surfaces 6 and 8 of grippers 10 are arranged to make area-to-area contact with surfaces 35 and 36 respectively when the grippers are in recessed position.

Figure 5:
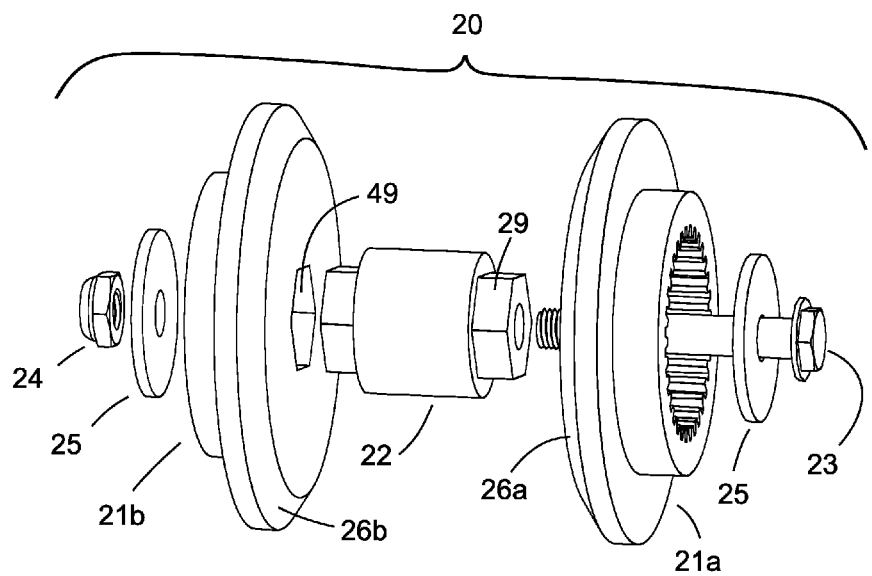
FIG. 5 is an exploded view of load rotor 20 of clutch 100.

FIG. 5 is an exploded view of load rotor 20 of clutch 100. Disc 21$a$ and disc 21$b$ are attached in a rotationally and longitudinally ridged manner to inner shaft 22 so that a fixed longitudinal distance separates contact races 26$a$ and 26$b$. Inner shaft 22 is fashioned to present a smaller rotational radius than races 26$a$ and 26$b$. Any means known in the art may be selected for rigid attachment of the discs to the inner shaft. For example hex plugs 29 may be fashioned at the ends of inner shaft 22, and may be fitted to hex sockets 49 in the discs using bolt 23, nut 24 and washers 25.

Figure 6:
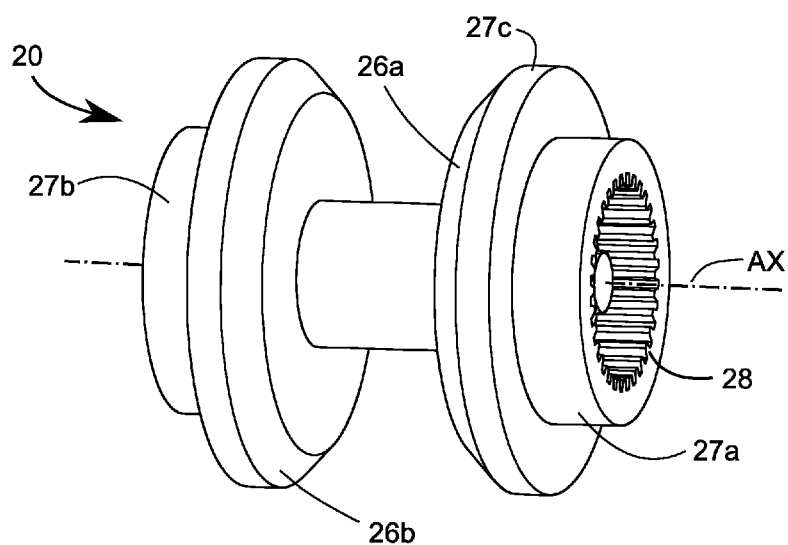
FIG. 6 is a perspective view of load rotor 20 of clutch 100.

FIG. 6 is a perspective view of load rotor 20 of clutch 100. Contact races 26a and 26b are conical surfaces facing radially outward and longitudinally inward. Load rotor 20 can be rotationally connected to the torque load by any means known in the art. For example splines 28 may be used. Any means known in the art can be used to arrange the load rotor to be rotatable about axis AX. For example, surfaces 27a and 27b may be used as bushing surfaces or bearing races for mounting the load rotor into a housing (not shown). In some embodiments connection of the load rotor to the torque load may fix the load rotor to the axis of rotation. In such cases surfaces 27 are not needed for mounting purposes. Alternative configurations for surfaces 27 and 28 and are not precluded. For example, splines or gear teeth may be placed on surfaces 27a or 27b, or the radius of surface 27a may be expanded to merge with surface 27c.

Figure 7:
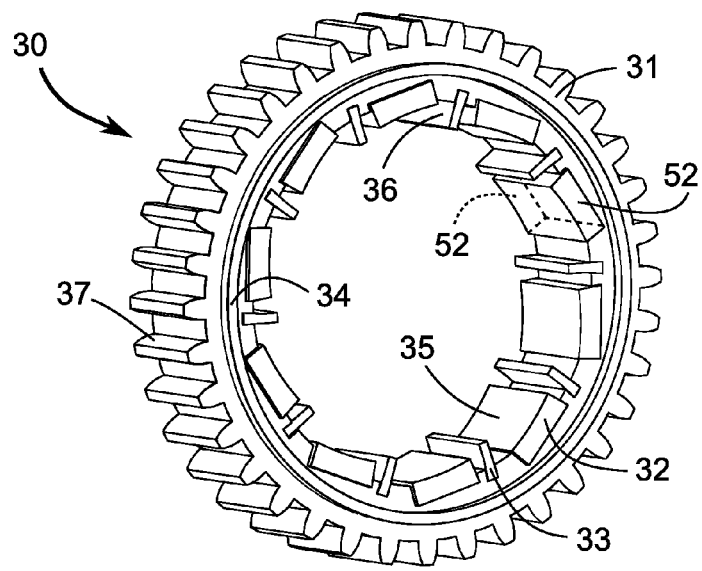
FIG. 7 is a perspective view of driving member 30 of clutch 100.

FIG. 7 is a perspective view of driving member 30 of clutch 100. Driving member 30 includes main gear 31, cam blocks 32 and stops 33. The driving member provides radially inward facing cam surfaces 35. Stop surfaces 36 protrude from the inner circumference of the driving member. In some embodiments front and back surfaces 52 of cam blocks 32 may be arranged to serve as guide slides for the clutch grippers. Driving member 30 can be rotationally connected to the source of rotating torque by any means known in the art. For example gear teeth 37 may be used. Any means known in the art can be used to arrange the driving member to be rotatable about axis AX in a manner that limits longitudinal movement relative load rotor 20. For example rim 34 may be used for attachment to a bearing race. Stop blocks 33 are composed of an impact absorbing material such as a visco-elastic polymer, and cam blocks 32 are made of a strong, hard material such as steel.

Figure 8:
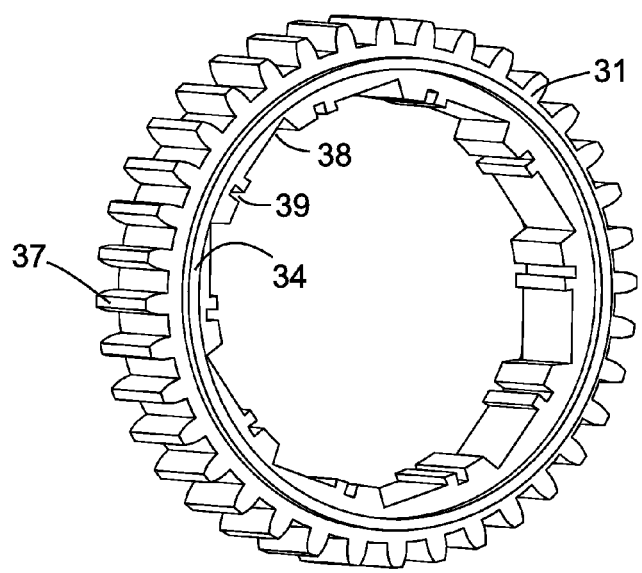
FIG. 8 is a perspective view of main gear 31 of clutch 100.

FIG. 8 is a perspective view of main gear 31 of clutch 100. Main gear 31 includes slots 38 and 39 for holding cam blocks 32 and stops 33, respectively. The cam blocks and stop blocks may be press fit into their respective slots or they may be attached to the main gear using other methods known in the art.

Figure 9:
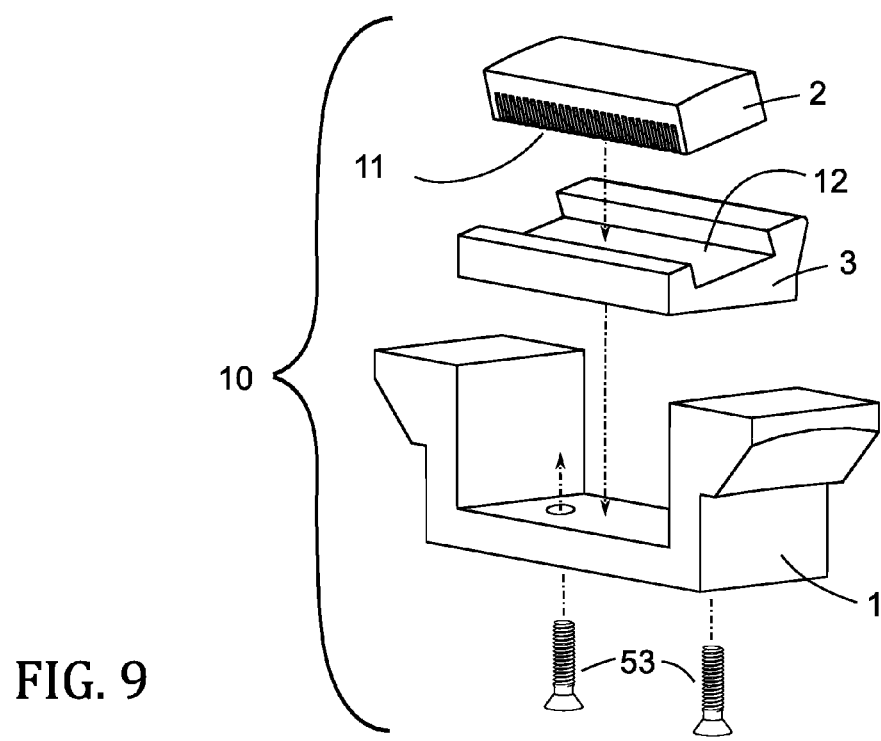
FIG. 9 is an exploded view of gripper element 10 of clutch 100.
Figure 10:
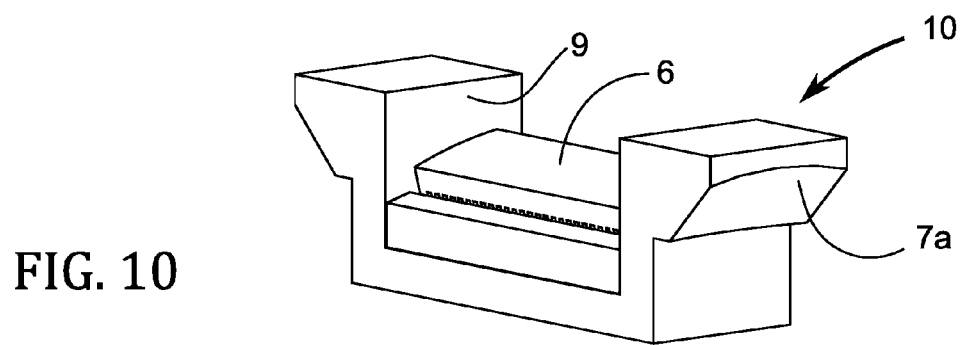
FIG. 10 is a perspective view of gripper element 10 of clutch 100.

FIG. 9 is an exploded view of gripper 10 of clutch 100. Cradle 1 and pad holder 3 are made of hard, high strength materials such as steel. Pad 2 is made of a polytetrafluoroethylene (PTFE) composite material. Expansion slots 11 of pad 2 provide stress relief from the difference in thermal expansion of the pad and holder materials. Pad 2 and slot 12 may be arranged for a dove-tail fit or other means may be used to attach the pad to the holder, such as using adhesive. Any means known in the art may be used for attaching pad holder 3 to cradle 1. For example bolts 53 may be used. FIG. 10 is a perspective view of gripper 10 of clutch 100. In some embodiments surfaces 9 may be arranged to slide against guide surfaces 52 of driving member 30 in the rotational and radial directions.

Figure 12:
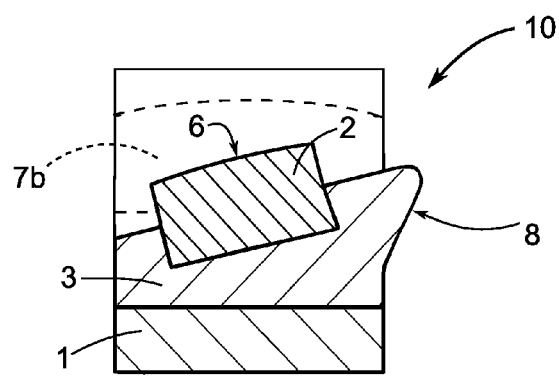
FIG. 12 is a sectional view of a gripper element 10 of clutch 100 taken along line 12-12 of FIG. 11.
Figure 13:
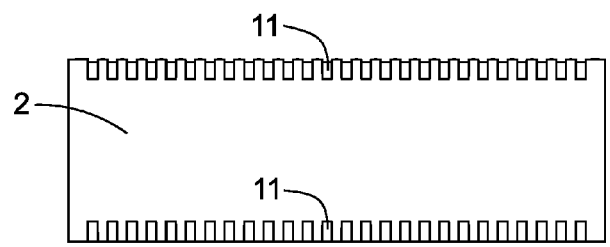
FIG. 13 is a bottom view of pad 2 of gripper element 10 in which the extent of expansion slots 11 is visible.
Figure 14:
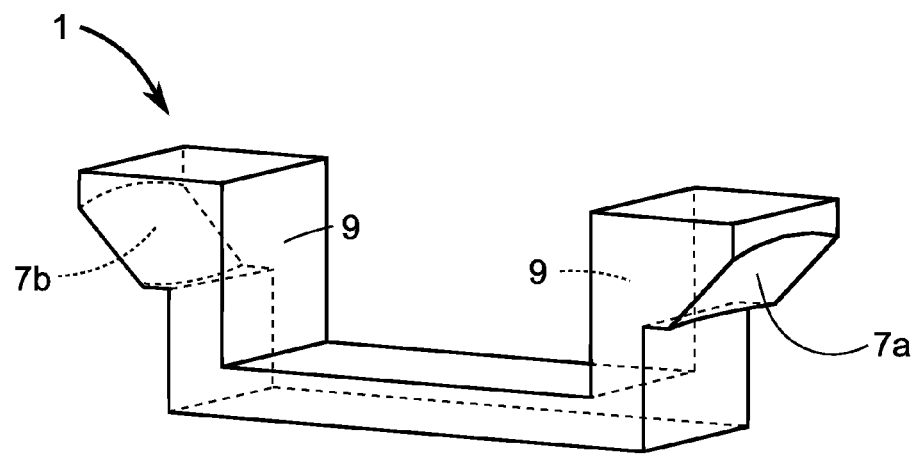
FIG. 14 is a perspective view of cradle 1 of gripper element 10.

FIG. 11 is a longitudinal view of gripper 10 of clutch 100. Surfaces 7a, 7b and 6 are shaped and arranged so that when grippers 10 are disposed in a locking position in relation to load rotor 20 and driving member 30, surfaces 7a make area-to-area contact with race 26a, surfaces 7b make area-to-area contact with race 26b, and surfaces 6 make area-to-area contact with a driving member cam surface 35. FIG. 12 is a sectional view of gripper 10 taken along line 12-12 of FIG. 11. A partial boundary of contact surface 7b is shown with hidden lines. FIG. 13 is a bottom view of pad 2 showing the extent of expansion slots 11. FIG. 14 is a perspective view of cradle 1 showing contact surface 7a and showing surface 7b with hidden lines. Surfaces 9 are also shown.

Figure 15:
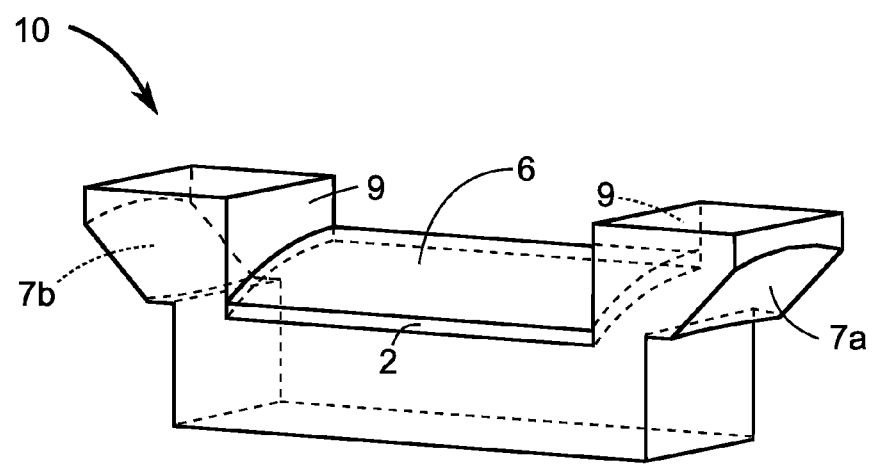
FIG. 15 is a perspective view of an alternative embodiment of gripper element 10.
Figure 16:
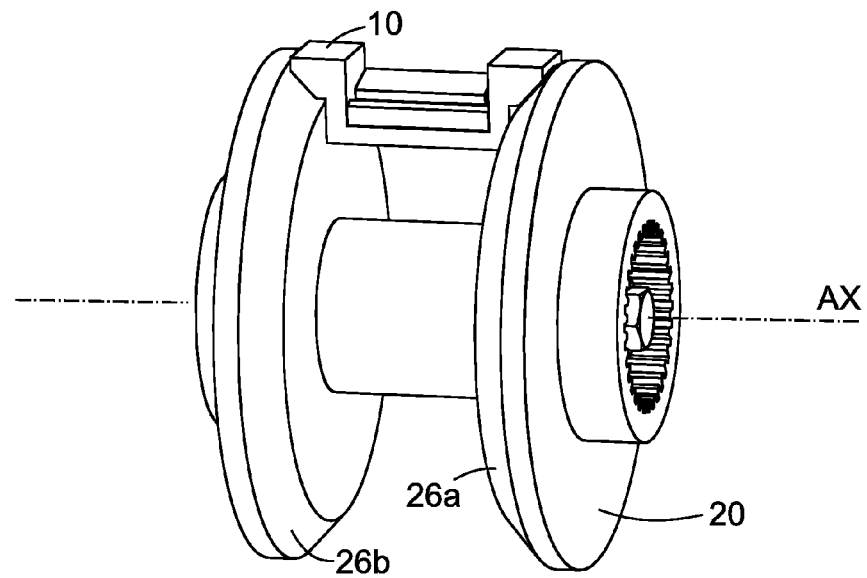
FIG. 16 is a perspective view of load rotor 20 and a single gripper element 10, with the gripper element located in its locking position.

FIG. 15 is a perspective view of an alternative embodiment of gripper 10. In this alternative embodiment surfaces 6, 7a, 7b and surfaces 9 are all formed on a single block and low-friction coating 2, consisting of a material such as PTFE, is deposited on surface 6. FIG. 16 is a perspective view of load rotor 20 and a single gripper 10, with the gripper disposed in its locking position in relation to the load rotor.

Figure 17:
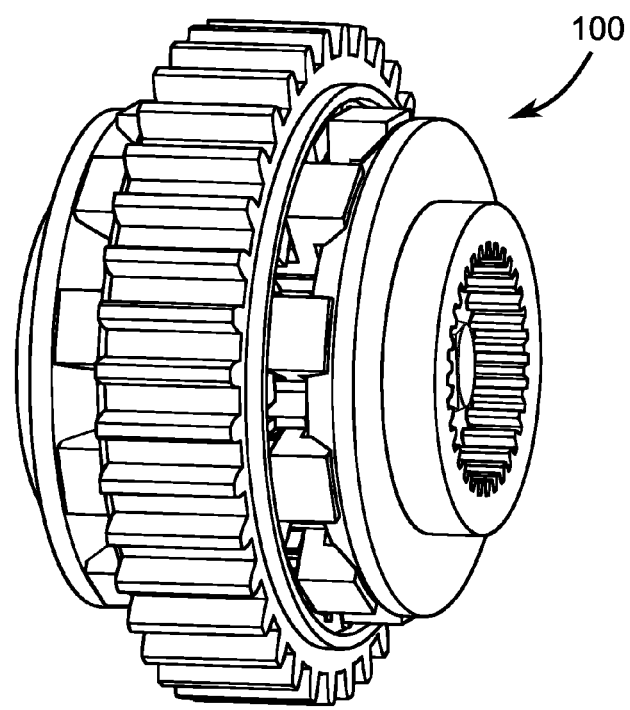
FIG. 17 is a perspective view of clutch 100.

FIG. 17 is a perspective view of the one-way clutch 100.

Figure 18:
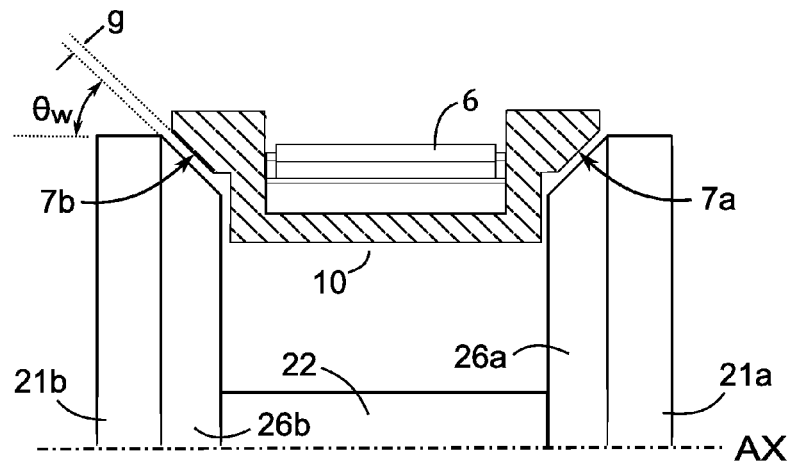
FIG. 18 is schematic longitudinal view of load rotor races 26a, 26b, and gripper element 10 with the gripper located in a recessed position.
Figure 19:
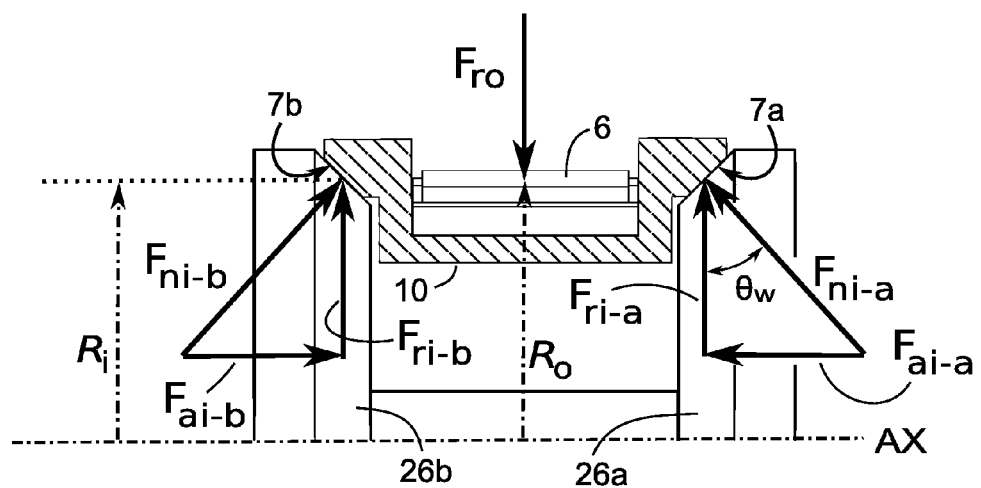
FIG. 19 is a schematic longitudinal view of load rotor races 26a, 26b, and gripper element 10 in its locking position, with a diagram of the forces acting upon the gripper projected onto the illustration.

FIG. 18 is a schematic longitudinal view of load rotor races 26a, 26b and gripper 10 with gripper 10 shown in a recessed position. Load rotor races 26a and 26b are angled at a bevel angle θw to the axis of rotation AX. When the grippers are in recessed position a gap g separates surfaces 7a and 7b of the grippers from races 26a and 26b. FIG. 19 is a schematic longitudinal view of the load rotor races and a gripper with the gripper 10 shown in locking position.

Figure 27:
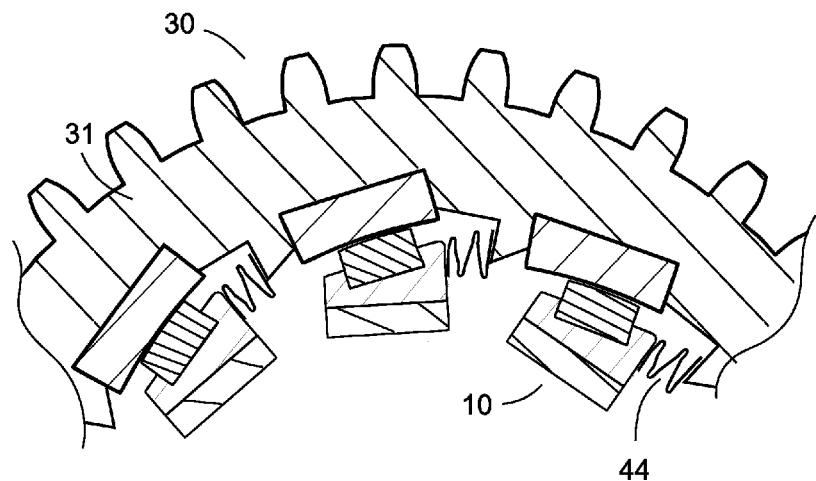
FIG. 27 is a partial front sectional view of an alternative embodiment of the present invention illustrating the inclusion of elastic elements 44.
Figure 28:
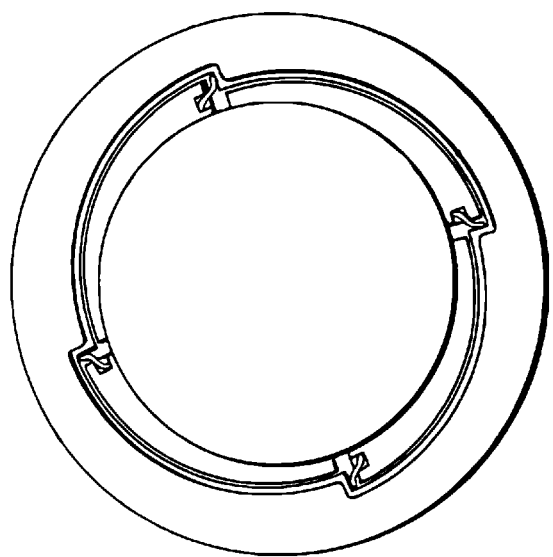
FIG. 28 is a front view of a prior art one-way wedge clutch.
Figure 29:
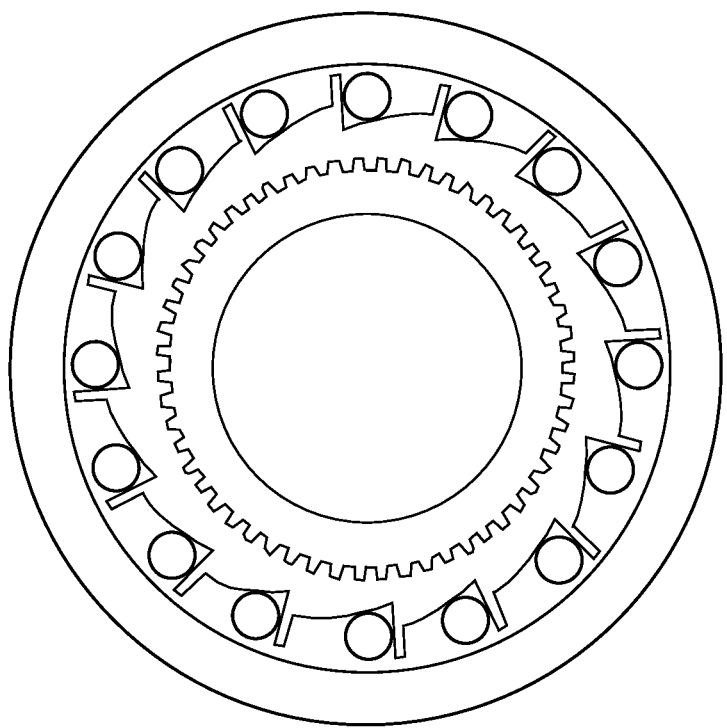
FIG. 29 is a front view of a prior art one-way roller-ramp clutch.

The operation of the present invention is now described in light of FIGS. 1 through 19. Referring to FIG. 3, $\omega_i$ identifies the speed of rotation of load rotor 20 and inner shaft 22. The speed of rotation of driving member 30 is labeled $\omega_o$. For this discussion $\omega_i$ and $\omega_o$ are referenced to the stationary frame of reference and direction D1 is chosen for the positive rotational direction. When the gripper elements are in a recessed position, with no contact made with the load rotor, the load rotor and driving member are free to rotate independently of one another. When one or more grippers are in locking position the driving member is free to rotate in direction D2 relative the load rotor, and the load rotor is free to rotate in the D1 direction relative the driving member. That is, the driving member and load rotor are allowed to freewheel when $\omega_o$ is less than $\omega_i$. In some embodiments of the invention, for example clutch 100, centrifugal forces during freewheeling rotation of the driving member move the gripper(s) into their recessed position and the grippers cause no frictional resistance to freewheeling. In alternative embodiments using biasing springs, such as illustrated in FIG. 27, the grippers may make contact with the load rotor during freewheeling but in a manner that causes little frictional resistance, depending on spring length and stiffness.

Referring again to FIG. 3, when one or more grippers are situated in the locking position the gripper(s) perform a self-locking action that prevents rotational speed $\omega_o$ from exceeding $\omega_i$. When torque is applied in direction D1 to the driving member, torque is transmitted through the grippers to the load rotor, counter-torque is transmitted from the load rotor to the driving member, and rotation of the load rotor and driving member is locked. A gripper which is locked and transferring torque will be said to be in locking mode. If the clutch is in an unlocked state, torque applied in direction D1 to the driving member urges the grippers into their locking position. In embodiments such as illustrated in FIG. 27, elastic elements 44 may be employed to urge the grippers into locking position in addition to the force generated by torque applied to the driving member.

The forces impinging on the contact surfaces of the grippers 10 during locking mode are now described. FIG. 19 includes a longitudinal diagram of the forces acting on gripper 10 during locking mode. Fro is the radial component of the total force on surface 6. Forces Fni-a and Fni-b are the normal components of the forces on gripper surfaces 7a and 7b from contacting surfaces 26a and 26b. Force Fri-a is the radial component and Fai-a is the longitudinal component of the force on surface 7a. Force Fri-b is the radial component and Fai-b is the longitudinal components of the force on surface 7b. Fai-a is equal in magnitude and opposite in direction to Fai-b so the total longitudinal force on gripper 10 is null. The angle between Fni-a and Fri-a is angle θw, as is the angle between Fni-b and Fri-b. We observe that the relationship at both surfaces 7a and 7b of the normal to radial force components is:

$$Fni=Fri/\cos(\theta w) \quad (2)$$

Referring again to FIG. 19, the rotational radius of force Fro is Ro, and the rotational radius of forces Fni-a and Fni-b is Ri. The configuration of surfaces 26a, 26b, 6, 7a and 7b is arranged so that Ri approaches the value of Ro. Specifically, because surfaces 6, 7a and 7b are separated longitudinally the ratio Ri/Ro can be made close to or equal to unity.

Figure 20:
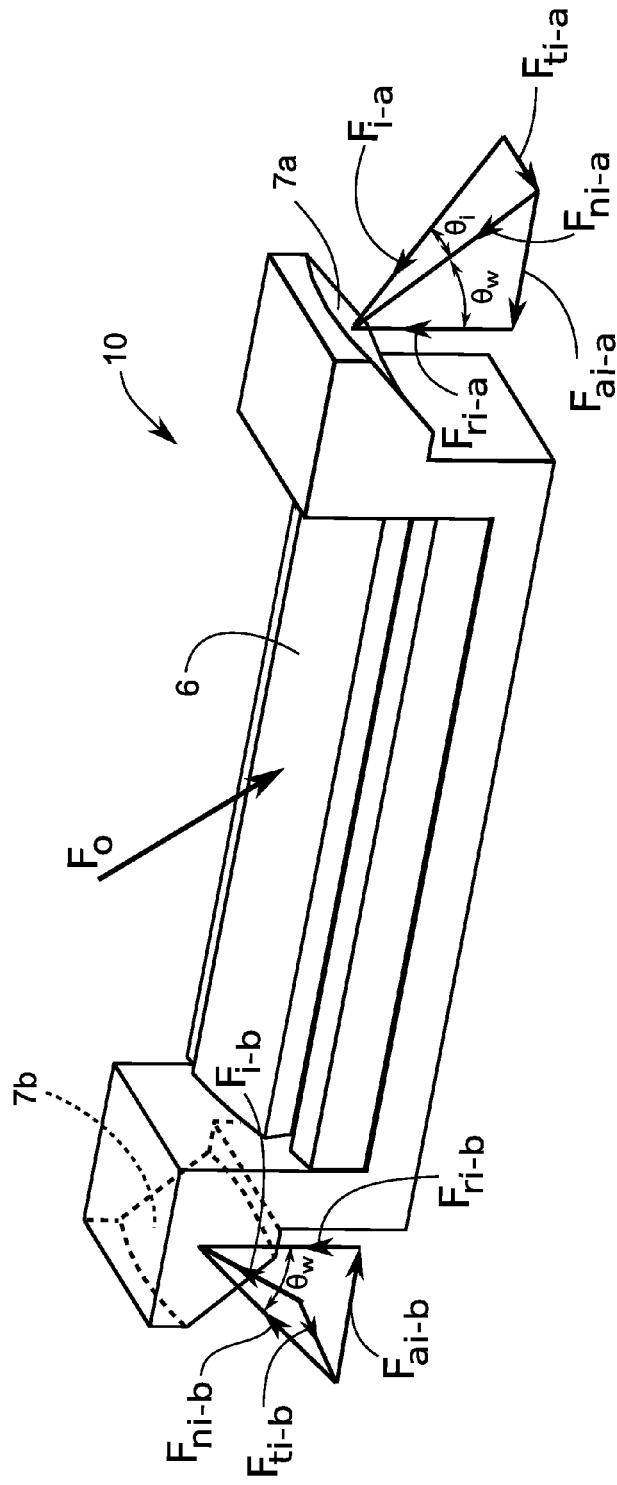
FIG. 20 is a perspective view of gripper 10 with a diagram of the forces acting upon the gripper projected onto the illustration.

FIG. 20 is a perspective view of the contact forces impinging on gripper 10 when in locking mode. Fo is the summation of pressure on surface 6 from contact with cam surface 35 of the driving member. Fi-a is the total force on surface 7a from contacting load rotor race 26a. Fni-a is the normal component of Fi-a (also shown in FIG. 19). Fti-a is the frictional force on surface 7a and is also the rotational component of Fi-a. The angle between Fi-a and Fni-a is angle θi. Surface 7b is impinged by corresponding forces Fi-b, Fni-b and Fti-b of near or equal magnitude to forces Fi-a, Fni-a and Fti-a, respectively.

Figure 21:
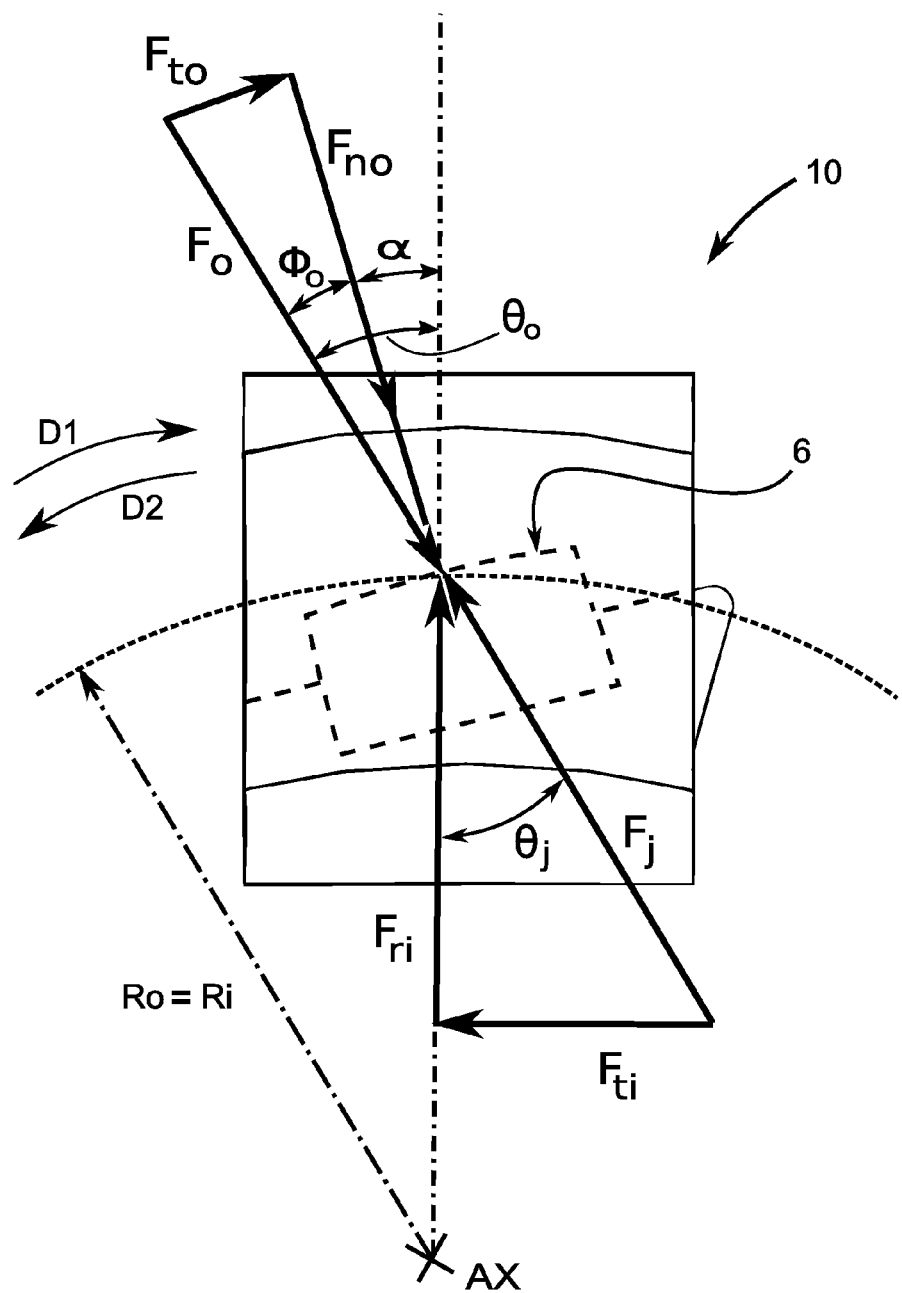
FIG. 21 is a front view of gripper 10 with a diagram of the forces acting upon the gripper projected onto the illustration.

FIG. 21 diagrams the forces acting on gripper 10 in locking mode from a front view. Fo is the total force acting on gripper surface 6. Fto is the frictional component and Fno is the normal component of Fo. Force Fti is the total frictional force from contacting the load rotor races and is the sum of the forces Fti-a and Fti-b described in FIG. 20. Fri is the total of the radial component of the forces from contacting the load rotor races and is the sum of the forces Fri-a and Fri-b shown in FIGS. 19 and 20. Fj is the sum of Fti and Fri. FIG. 21 illustrates the case when rotational radius Ro of force Fo is equal to rotational radius Ri of force Fj.

The self-locking action of grippers 10 is now described in terms of the forces diagrammed in FIGS. 19, 20 and 21. First we examine an initial condition in which grippers 10 are in locking position and the load rotor races are slipping in direction D2 against the grippers. This initial condition will be referred to as the lash condition. During the lash condition the force angle θi shown in FIG. 20 is the arctangent of μi, the kinetic coefficient of friction at the interface. The relation of Fti and Fni is therefore:

$$Fti=\mu i*Fni. \quad (3)$$

Substituting equation (2) for Fni in equation (3) reveals:

$$Fti=\mu i*(Fri/\cos(\theta w)) \quad (4)$$

and therefore:

$$Fti/Fri=\mu i/\cos(\theta w). \quad (5)$$

Referring to FIG. 21 we observe that the ratio Fti/Fri is the tangent of angle θj, so the value of θj during the lash condition is known:

$$\theta j=\text{Arctan}(\mu i/\cos(\theta w)). \quad (6)$$

Again referring to FIG. 21, when forces Fo and Fj are equal and opposite in magnitude and co-linear gripper 10 will remain stationary relative the driving member with no slipping at surface 6. In this case angles θo is equal to angle θj and, because the sum of angles φo and angle α is equal to θo, we have:

$$\phi o+\alpha=\theta j, \quad (7)$$

and therefore:

$$\phi o=\theta j-\alpha. \quad (8)$$

However if φo exceeds the friction angle arctan(μo) during the lash condition, where μo is the static coefficient of friction at surface 6, gripper 10 will slip against the driving member in direction D2. This slip at surface 6 increases compression on the gripper until ratio Fti/Fni drops below the coefficient of friction at the load rotor races. Therefore during the lash condition the grippers will grab and lock the load rotor if angle φo exceeds arctan(μo). Inserting this condition into equation (8) gives us the requirement for self-locking action of the grippers:

$$\text{arctan}(\mu o)<\theta j-\alpha \quad (9)$$

Substituting equation (6) for θj in equation (9) the conditions for self-locking action is expressed in terms of angle α, θw, and μi μo:

$$\alpha<\text{arctan}(\mu i/\cos(\theta w))-\text{arctan}(\mu o). \quad (10)$$

Figure 22:
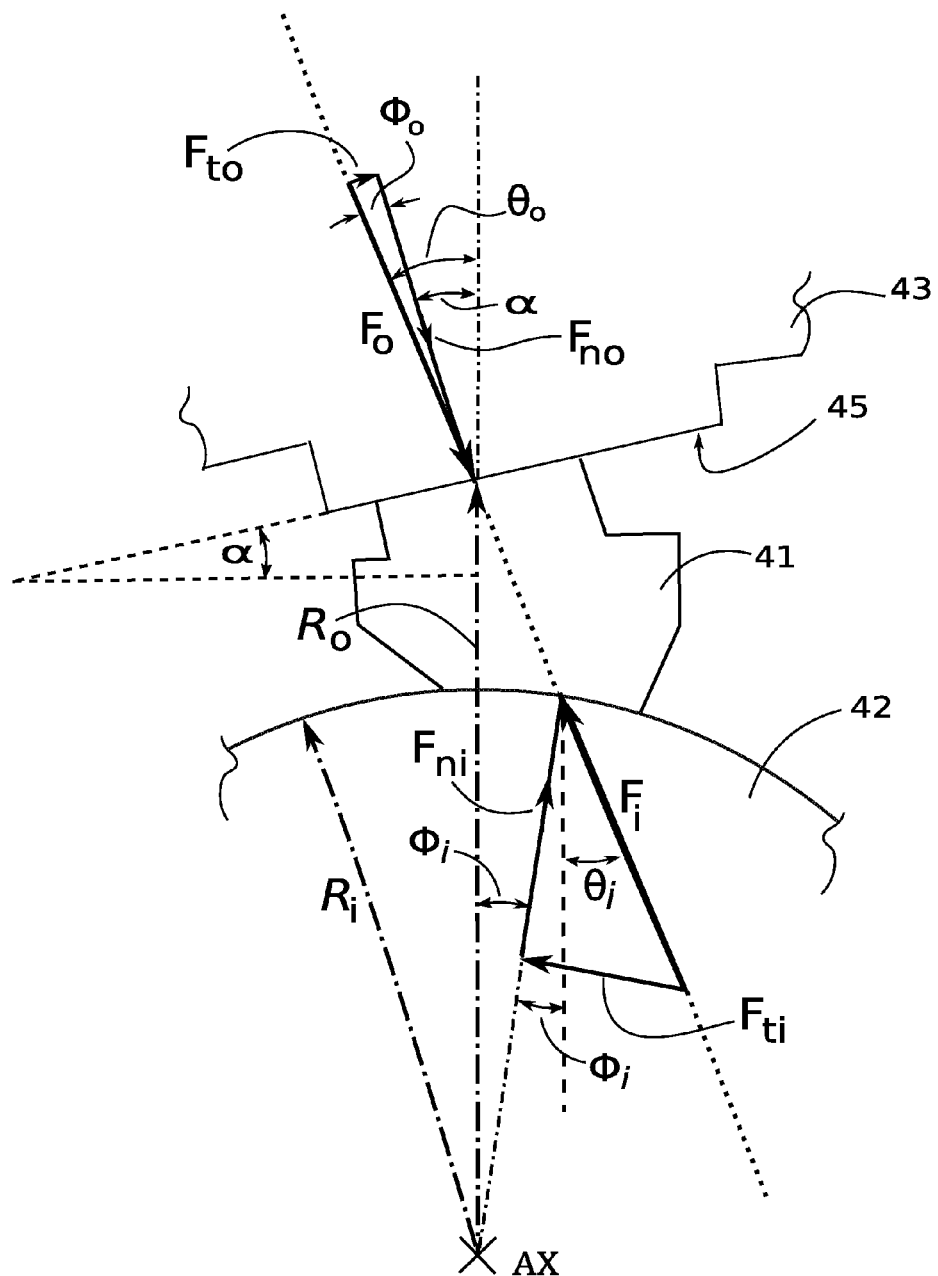
FIG. 22 is a schematic front view of a prior art one-way wedge clutch with a diagram of the forces acting upon the wedge projected onto the illustration.

The difference between requirements (10) and (1) should be noted. Requirement (1) describes the self-locking requirement of the conventional wedge-clutch configuration illustrated in FIG. 22 and includes the term φi. But φi goes to zero as the ratio Ri/Ro approaches unity. Therefore the negative effect of φi on the maximum ramp angle is negligible or absent in the self-locking action of the grippers in the present invention.

Figure 23:
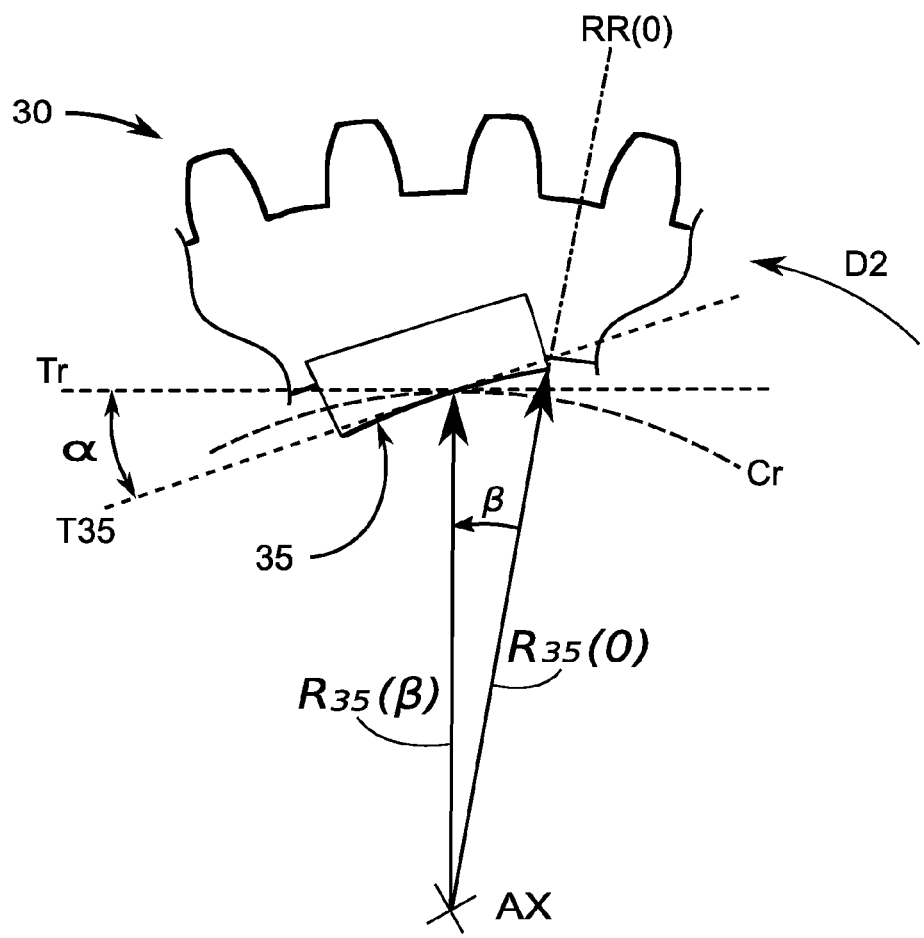
FIG. 23 is a schematic front view cam surface 35 depicting the variables used to calculate the curvature of the surface.

FIG. 23 is a schematic front view of cam surface 35 demonstrating the curvature of the cam surfaces of clutch 100. RR(0) is the radial at the leading edge of surface 35 of driving member 30. $R_{35}(0)$ is the rotational radius of surface 35 at the leading edge. $R_{35}(0)$ is also the point of maximum rotational radius of the surface and will be designated $R_{max}$. $R_{35}(\beta)$ is the rotational radius of surface 35 at rotational angle β, measured in radians, from RR(0) in direction D2. In the preferred embodiments of the present invention the curvature of surface 35 follows a logarithmic spiral according to the polar co-ordinate formula:

$$R_{35}(\beta)=R_{max}*\exp(-\tan(\alpha)*\beta) \quad (11)$$

for: $0 \leq \beta \leq \beta_{max}$ where $\beta_{max}$ is the value of β at the trailing edge of surface 35 and signifies the angular span of the surface. The value α is the chosen ramp angle of cam surface 35 selected according to requirement (10).

It is now shown that logarithmic curve (11) produces even pressure over surface 6 of grippers 10 when the grippers are in locked position and transferring torque. In the invention's preferred embodiments the curvature of surface 6 matches or closely approximates the curvature of surface 35 when the gripper is in locking position. During the lash condition described above the gripper slides a differential distance dS across surface 35 until lock is achieved. The gripper is compressed against the load rotor races as the gripper is forced radially inward during this lash motion. The pressure at each point on surface 6 is proportional to the differential ratio dR/dS at the point, where dR is the radial displacement caused by motion dS. But the differential $dR_{35}(\beta)/dS$ of curve (11) is a constant value for all points along the surface:

$$dR_{35}(\beta)/dS=-\tan(\alpha). \quad (12)$$

Therefore during torque transfer the pressure is constant or nearly constant over the span of gripper surface 6.

During the operating life of the clutch it is expected that surface wear and temperature variations will change the distance that the grippers slide across cam surfaces 35 as they move from their recessed position to their locking position. The logarithmic nature of curve (11) maintains alignment of the grippers in the roll direction as this sliding distance changes. Referring again to FIG. 23, Cr is the rotational circle of point $R_{35}(\beta)$ on surface 35. Tr is the tangent to Cr and T35 is the tangent to the surface at $R_{35}(\beta)$. For curve (11) the angle between Tr and T35 is constant and is equal to ramp angle $\alpha$ at all values $\beta$ across the span. Therefore the roll alignment of the grippers in relation to load rotor races is constant as the angle $\beta$ of the locking position changes.

When the curvature of the cam surfaces of the invention is made according to curve (11) the performance of the clutch is generally maximized. In embodiments that include gripper elements that span a large rotational angle implementation of curve (11) is recommended. It should be appreciated, however, that various embodiments of the invention may implement other curvatures as long as the curvature produces self-locking action of the clutch grippers. For example, a circular curvature or even a flat cam surface may be used especially with gripper elements spanning a small rotational angle.

Various alternative embodiments of the current invention are now described. Referring to expression (10), clutch 100 achieves a high ramp angle $\alpha$ and low compression pressures in part by implementing load rotor races with bevel angle $\theta$w. A low coefficient of friction $\mu$o at the interface between gripper surfaces 6 and cam surfaces 35 also increases the attainable ramp angle. Clutch 100 provides a low $\mu$o value by fabricating gripper pad 2 of a PTFE material. Alternative methods of providing a low $\mu$o value may be used. For example cam block 32 of the driving member may be composed of a PTFE composite, or cam surface 35 of the driving member may be coated with a low-friction material. In these cases gripper surface 6 may be formed on a material other than PTFE, such as steel.

Figure 24:
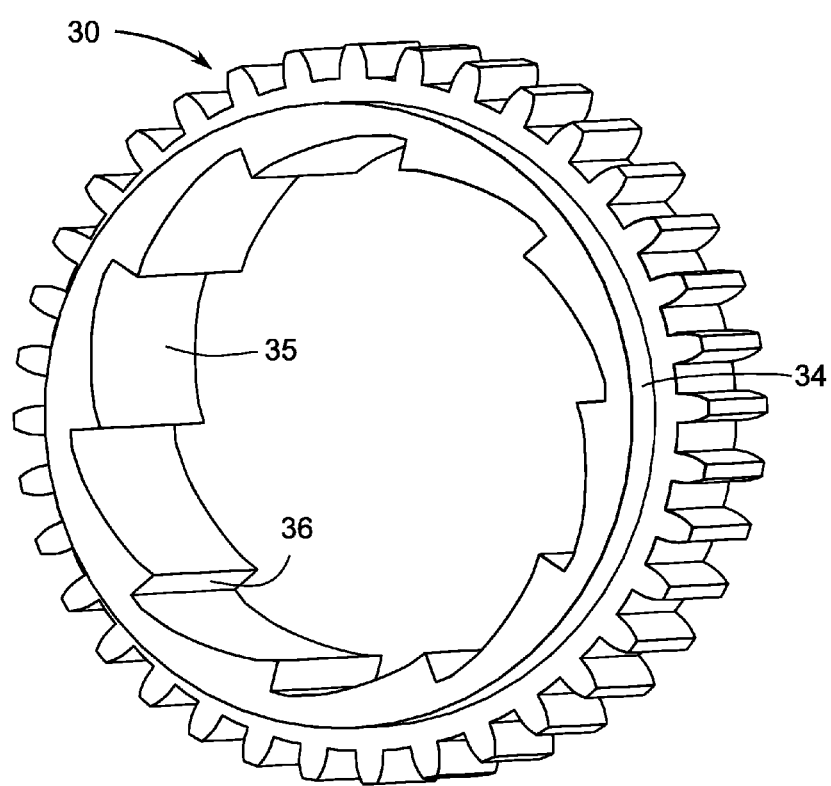
FIG. 24 is a perspective view of an alternative embodiment of driving member 30.

FIG. 24 is a perspective view of an alternative embodiment of driving member 30. In this embodiment cam surfaces 35 are formed directly on the inner circumference of the driving member. Although the stops in clutch 100 are made of an impact absorbing material the stop surfaces may be formed on other materials in alternative embodiments. For example, stop surfaces 36 in FIG. 24 are formed directly on the driving member inner circumference. It should also be appreciated that other embodiments of the invention may implement stop surfaces of various curvatures other than the surface implemented in clutch 100.

Figure 25:
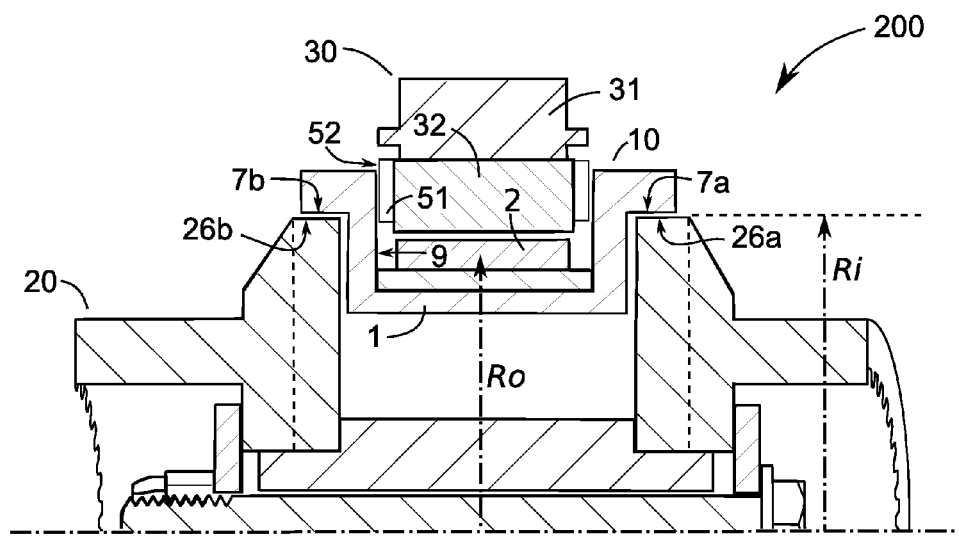
FIG. 25 is longitudinal sectional view of an alternative embodiment of the present invention, clutch 200.

FIG. 25 is a longitudinal sectional view of clutch 200, an additional embodiment of the current invention. Clutch 200 includes an alignment means for limiting longitudinal, pitching and yawing movement of grippers 10 during operation of the clutch. Surfaces 52 of driving member 30 are arranged to form guide slides for the grippers. Contact between surfaces 9 and 52 limit yawing, pitching and longitudinal motion but allow the grippers to slide in the radial and rotational directions relative to the driving member. Low-friction coating 51 may be applied to cam blocks 32, or to gripper surfaces 9, to promote easy sliding of the surfaces. Clutch 200 load rotor races 26a and 26b are not beveled, therefore the term cos($\theta$w) in expression (10) is unity and does not assist in maximizing $\alpha$. However the clutch 200 races are arranged so that rotational radius Ri is greater than Ro. This introduces the term $\phi$i, described above, in a manner that assists in maximizing ramp angle $\alpha$. In this case the conditions for self-locking action of the grippers is expressed as:

$$\alpha < \arctan(\mu i) - \arctan(\mu o) + \phi i \qquad (13)$$

Figure 26:
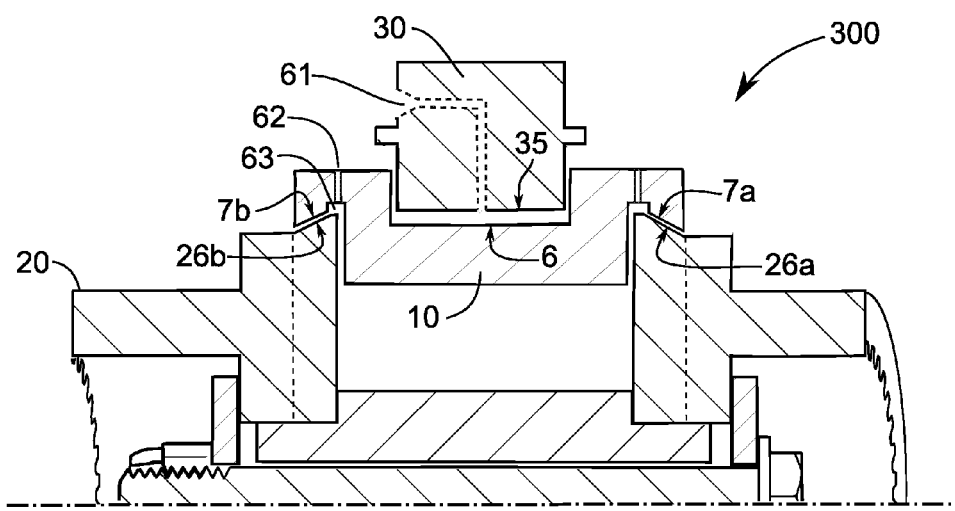
FIG. 26 is longitudinal sectional view of an alternative embodiment of the present invention, clutch 300.

FIG. 26 is a longitudinal sectional view of clutch 300, a further embodiment of the current invention. Clutch 300 includes a lubricating substance, such as oil or grease, to lower friction at the cam surfaces, thus providing a low value $\mu$o. Channel 61 provides means for ejecting the lubricant to the cam surfaces 35. Alternatively lubricant may be directed to the cam surfaces by other means, for example with an external spray nozzle or jet (not shown). Sump cavity 63 provides a means for catching the splash of lubricant that may occur during clutch operation. Channel 62 provides a means for evacuating lubricant splash from the sump cavity. Clutch 300 load rotor races 26a and 26b are radially outward facing and longitudinally outward facing conical surfaces. The bevel angle of the races serves to spin any lubricant splash, with the influence of centrifugal forces, away from the race surfaces.

FIG. 27 is a partial front sectional view of another embodiment of the present invention. This embodiment includes elastic elements 44 attached to either main gear 31 or grippers 10, or both. The elastic elements serve to limit rotation of the grippers in direction D1 as do the stops of previous described embodiments. The elastic elements may be employed to serve in the manner of biasing springs used in conventional technologies. Used as biasing springs the elastic elements are placed to urge the grippers into locking position in addition to or in the absence of inertial forces. But the elastic elements may be employed for other purposes. For example, elements 44 can be employed to pull grippers 10 out of contact with the load rotor races and into a slightly recessed position when the driving member is motionless and centrifugal forces are absent.

In yet another embodiment of the present invention the values for ramp angle $\alpha$ of driving member surfaces 35, bevel angle $\theta$w of load rotor contact races, and the ratio Ri/Ro are selected so that self-locking action of the grippers 10 is achieved without use of lubrication or low friction materials to lower the value of $\mu$o. This type of embodiment may be useful in some applications, for example when torque loading is relatively light.

It should be noted that for clarity the direction of torque transmission described for clutch 100 corresponds to the expected use of the present invention in most common circumstances. However, the disclosure is not limited to these circumstances and may be used in a manner that reverses the direction of torque transmission described above. That is, the load rotor may be connected to a source of rotating power, or may be held stationary in cases where the clutch is used as a break or backstop. In these uses the driving member may be arranged for rotational connection to a torque load.

What I claim is:

1. A one-way clutch, comprising:
    a load rotor including a first race and a second race and an inner shaft, with each race consisting of a radially outward facing circular contact surface rotatable about an axis of rotation, with each race rigidly connected to the inner shaft so that a fixed longitudinal distance separates the first and second races, with said inner shaft having a smaller rotational radius than the rotational radii of the races;
    a driving member rotatable co-axially with said load rotor, including an inner circumference with at least one radially inward facing cam surface, with most or all of each cam surface rotatable within said longitudinal distance separating said load rotor first and second races, said load rotor and driving member providing a space therebetween;

at least one gripper element for the performance of torque transmission between said driving member and said load rotor, said gripper elements located and movable within the space between said load rotor and driving member, with each gripper element including a first gripping surface and a second gripping surface and a sliding surface, with the sliding surface disposed between the first and second gripping surfaces;

a stop for each said gripper element protruding from said driving member adapted to limit rotation of the gripper element in the first rotational direction relative the driving member;

wherein said gripper surfaces are arranged to provide a locking position in which said first gripping surface makes area-to-area contact with the said load rotor first race, said second gripping surface makes area-to-area contact with said load rotor second race, and said gripper sliding surface makes area-to-area contact with a cam surface of said driving member.

2. The one-way clutch of claim 1 wherein:
the contacting surfaces of said gripper elements, load rotor and driving member are arranged so that during freewheeling rotation of the driving member the gripper elements are urged radially outward from said locking position.

3. The one-way clutch of claim 1 wherein:
the contacting surfaces of said gripper elements, load rotor and driving member are arranged so that when the gripper elements are disposed in said locking position at least one contact point between said gripping surfaces and said load rotor races has a rotational radius equal to or greater than the rotational radius of at least one contact point between said slipping surface and said driving member cam.

4. The one-way clutch of claim 1 wherein:
said gripper element slipping and gripping surfaces, and said load rotor races, and said driving member cam surfaces consist of materials producing a lower coefficient of friction between the gripper elements and driving member cams than the coefficient of friction between the gripping elements and load rotor races.

5. The one-way clutch of claim 1 wherein:
a means is included for providing a lubricating substance to the interface of said gripper element slipping surfaces and driving member cam surfaces.

6. The one-way clutch of claim 1 wherein:
each said load rotor race is slanted to the axis of rotation to form a conical surface.

7. The one-way clutch of claim 1 wherein:
said driving member cam surfaces form a logarithmic spiral.

8. The one-way clutch of claim 1 wherein:
said driving member includes at least one alignment surface adapted to limit motion of said gripper elements, in relation to the driving member, in the yawing or pitching or longitudinal directions, or any combination of yawing or pitching or longitudinal directions.

9. The one-way clutch of claim 1 wherein:
said stops are composed of an impact absorbing material.

10. The one-way clutch of claim 1 wherein:
said stops are arranged to reflect impact rebound of said gripper elements radially outward.

11. The one-way clutch of claim 1 wherein:
said stops include an elastic material.

* * * * *